US008832168B2

(12) United States Patent
Sazegari et al.

(10) Patent No.: US 8,832,168 B2
(45) Date of Patent: Sep. 9, 2014

(54) COMPUTATIONS OF POWER FUNCTIONS USING POLYNOMIAL APPROXIMATIONS

(75) Inventors: Ali Sazegari, Cupertino, CA (US); Ian Ollmann, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 13/233,441

(22) Filed: Sep. 15, 2011

(65) Prior Publication Data

US 2012/0001933 A1 Jan. 5, 2012

Related U.S. Application Data

(63) Continuation of application No. 12/683,632, filed on Jan. 7, 2010, now Pat. No. 8,046,397, which is a continuation of application No. 10/645,555, filed on Aug. 22, 2003, now Pat. No. 7,668,894.

(51) Int. Cl.
*G06F 1/02* (2006.01)
*G06F 7/552* (2006.01)

(52) U.S. Cl.
CPC .............. *G06F 7/552* (2013.01); *G06F 7/5525* (2013.01); *G06F 2207/5523* (2013.01)
USPC .......................................... 708/270; 708/277

(58) Field of Classification Search
CPC ....................................................... G06F 7/552
USPC .................................................. 708/270, 277
See application file for complete search history.

(56) References Cited

U.S. PATENT DOCUMENTS

| 4,326,260 | A | 4/1982 | Gross |
|---|---|---|---|
| 5,068,816 | A | 11/1991 | Noetzel |
| 5,235,410 | A | 8/1993 | Hurley |
| 5,724,036 | A | 3/1998 | Kobayashi et al. |
| 5,818,521 | A | 10/1998 | Hieda |
| 5,990,894 | A | 11/1999 | Hu et al. |
| 6,002,726 | A | 12/1999 | Simanapalli et al. |
| 6,360,023 | B1 | 3/2002 | Betrisey et al. |
| 6,931,426 | B2 | 8/2005 | Cho |
| 2002/0149806 | A1 | 10/2002 | Westerman |
| 2003/0195907 | A1 | 10/2003 | Budge |

OTHER PUBLICATIONS

Numerical Recipes In C, "The Art of Scientific Computing", Chapter 5.8, pp. 190-195, 1992.*

* cited by examiner

*Primary Examiner* — Chuong D Ngo
(74) *Attorney, Agent, or Firm* — Fish & Richardson P.C.

(57) ABSTRACT

A power function is approximated over an applicable data interval with polynomials determined by means of a Chebyshev minimax approximation technique. In some cases, multiple polynomials may be used to approximate the function over respective ranges of the desirable interval, in a piecewise manner. The appropriate polynomial that approximates the power function over the range of interest is derived and stored. When the power function is to be applied to a particular data value, the data value is first evaluated to determine where it lies within the applicable interval. The constants for the polynomial associated with that range of the interval are then retrieved and used to calculate the power of that data value.

10 Claims, 3 Drawing Sheets

COMPUTATIONS OF POWER FUNCTIONS USING POLYNOMIAL APPROXIMATIONS

The present application is a continuation of application Ser. No. 12/683,632, filed Jan. 7, 2010, which is a continuation of application Ser. No. 10/645,555, filed Aug. 22, 2003, now U.S. Pat. No. 7,668,894.

The present invention is directed to the computation of power functions for multimedia applications, and the like, and more particularly to an approximation technique that enables such functions to be computed in a fast and accurate manner.

BACKGROUND OF THE INVENTION

In the execution of programs $V^1=V^{1/2.5}$ on a computer, it is often desirable, and sometimes necessary, to compute power functions for data being processed. For instance, display devices, such as CRT monitors and LCD screens, exhibit a non-linear intensity-to-voltage response. A curve that characterizes this response corresponds roughly to a power function, e.g. $L=V^{2.5}$, where V is the input voltage and L is the output intensity. The monitor hr this situation is therefore said to have a "gamma" of 2.5. To correct for the gamma of the display, it is a common practice to multiply the input signal by a factor which is an inverse of the gamma Thus, in this example, a gamma-corrected input voltage is computed to control the display device.

This gamma correction is computed for each pixel in the displayed image. In a high resolution display, a single image could consist of more than two million pixels. Thus, an appreciable portion of the computer's processing power is consumed by the calculation of power functions for the display of images.

Power functions are utilized in a variety of applications, in addition to gamma correction. In particular, multimedia applications employ power functions. For example, the decoding of audio files in the MPEG3 and MPEG4 formats requires the computation of power functions for quantization purposes. Similarly, a number of types of scientific computing employ power functions.

The computation of a power function is relatively expensive, from the standpoint of consumption of computer processing time. To reduce the overhead associated with the calculation of power functions, it has been a common practice to employ pre-calculated lookup tables that enable the calculated values to be retrieved in a time frame that is conducive to high throughput multimedia applications. However, certain limitations are associated with the use of lookup tables. First, lookup tables, by their nature, give limited precision results, and sometimes introduce substantial error into the calculation. Consequently, a degradation of signal quality may occur.

Second, each time that a call is made to a lookup table, the retrieval of a calculated value may cause other important data to be flushed from the cache memory of the computer. The loss of this data from the cache memory may result in performance problems elsewhere in the application being executed.

Third, a lookup table of the size necessary to reliably support operations such as gamma correction cannot be readily implemented in a vector processing architecture, also known as a single-instruction, multiple-data (SIMD) architecture. FIG. 1 illustrates an example of such an architecture. A computer system 10 includes a scalar floating point engine 12, and a vector floating point engine 14. The scalar engine 12 performs operations on a single set of data at a time, and hence is capable of producing one output value per operation. Conversely, the vector engine 14 operates upon arrays of data, and is therefore capable of producing multiple output results at once. For example, the vector processor 14 may contain registers which are each 128 bits in length. If values are represented in a 32-bit format, each register is capable of containing a vector of four data values. The vector processor operates upon these four data values simultaneously, for example adding them to a vector for other data values in another register, to produce four output values at once.

A memory 16 is accessible by both the scalar and vector processing engines, and can be used to transfer data between them, as well as to other system components (not shown). For operations that are not capable of being carried out in a vectorized manner, the input data values are transferred from the vector engine 14 to the memory 16. These data values are serially retrieved from the memory by the scalar processor 12, which performs the requested operation on one element of the input data vector at a time. The results of these scalar operations are stored in the memory 16, where they can be retrieved by the vector processor 14 to perform further operations.

It can be seen that, each time an operation must be performed in the scalar processor, the overall efficiency of the processing system suffers. First, the number of operations required to process the set of data increases by a factor of N, where N is the number of data values contained in a vector, e.g. 4 in the example given above. The efficiency is further diminished by the read and write operations needed to transfer data between the vector processor 14 and the scalar processor 12, via the memory 16.

Thus, it can be seen that a table lookup operation that is implemented in the scalar engine presents a significant bottleneck in the throughput rate for gamma correction and other operations that require a large number of power function calculations. It is desirable, therefore, to provide a technique for calculating power functions which eliminates the need to retrieve values from a large table of data. More specifically, it is desirable to provide such a technique which can be implemented within the vector processing engine, and thereby eliminate the inefficiencies associated with scalar operations.

SUMMARY OF THE INVENTION

In accordance with the present invention, the foregoing objectives are achieved by approximating a power function over an applicable data interval, using one or more polynomials. The approximating polynomial is preferably determined by means of a Chebyshev minimax approximation technique. The use of the Chebyshev minimax approximation technique satisfies the constraint that the function and its inverse map to an identity value over the range to which the approximation applies. In some cases, a single polynomial may provide a satisfactory approximation over the entire interval of interest. In other cases, multiple polynomials can be used to approximate the function over respective ranges of the desirable interval, in a piecewise manner. Preferably, when multiple polynomials are employed in such a manner, each polynomial is of the same order, and they differ from one another by their respective constants.

In the implementation of the invention, the appropriate polynomial that approximates the power function over the interval of interest, or a portion of that interval, is derived and stored. When the power function is to be applied to a particular data value, the data value is first evaluated to determine where it lies within the applicable interval. The polynomial associated with that range of the interval is then retrieved and used to calculate the power of that data value.

One of the particular advantages of the invention is the fact that the polynomial approximation can be calculated with multiply and add operations. Consequently, the approximation can be carried out within the vector processing engine. As such, a higher throughput rate for power function calculations can be achieved.

Further features of the invention, and the advantages achieved thereby, are described in detail hereinafter, with reference to exemplary embodiments illustrated in the accompanying drawings.

DETAILED DESCRIPTION OF THE INVENTION

To facilitate an understanding of the present invention, it is described hereinafter with reference to its implementation in the approximation of a power function that is utilized in multimedia applications. It will be appreciated, however, that the practical applications of the invention are not limited to this exemplary embodiment. Rather, the principles that underlie the invention can be applied to the calculation of any complex function where it is desirable to provide a fast and accurate approximation that can be performed within a vector processing engine.

Figure 1:
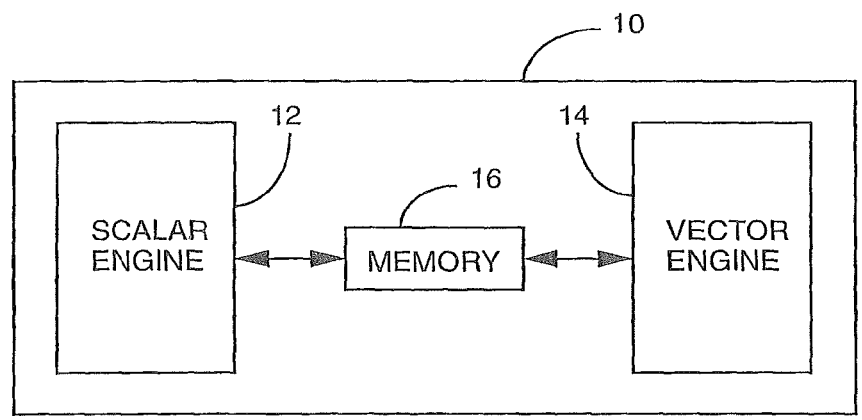
FIG. 1 is a block diagram illustrating components of a vector processing architecture.
Figure 2A:
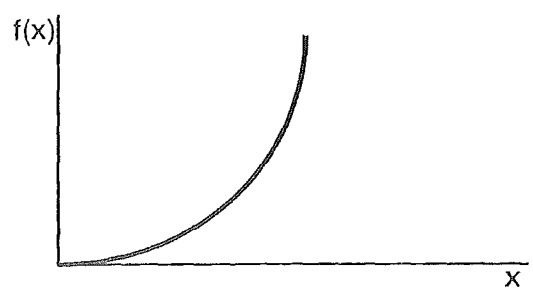
FIGS. 2a and 2b are graphs of representative power functions.
Figure 2B:
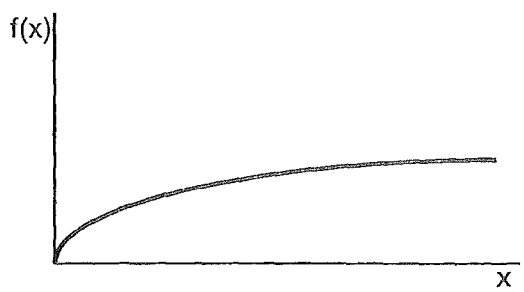

FIGS. 2a and 2b are representative graphs of a power function and its inverse, respectively. For example, FIG. 2a might represent the function $f(x)=x^{2.5}$, and FIG. 2b represents $f(x)=x^{1/2.5}$. These functions can be very expensive to calculate, in terms of the number of processing cycles necessary to obtain a result for a given item of input data. In accordance with the present invention, the computational time required to determine the output value for a given input value is reduced by approximating the power function with a polynomial.

Some processes involve a "round trip" that utilizes both a power function and its inverse to complete an operation. For example, when blending two images, for instance during a fade-in or similar transition, it is desirable to operate in a linear color space. However, the color space that is used in the operating system is typically not linear, e.g. a pixel having a value of "5" is not 25% brighter than a pixel with a value of "4". To perform the blending operation, therefore, the two pixels to be blended are each gamma corrected by computing the appropriate power function to bring them into a linear color space, their corrected values are combined in this color space, and the result is then converted back to the original color space, using the inverse of the power function.

As another example, when performing advanced audio coding (AAC) in the MPEG4 format, the audio data is compressed by means of a power function, e.g. 3/4, for storage on a disk or the like. Subsequently, when the audio is to be played back, the stored data is decompressed using the inverse power, namely 4/3 in the given example.

Consequently, one of the constraints that is imposed by multimedia applications is that the function and its inverse must map to the identity function over the interval of interest. In other words, $y=(x^{1/n})^n$ should return $y=x$. If this condition is not met, unacceptable drift can result over multiple calculations. This phenomenon is particularly evident for power functions, where small deviations over an input range can produce large deviations in the output results. Consequently, the approximation of a power function and its inverse must have an error that is below a prescribed value, in order to meet this constraint.

In accordance with the present invention, these criteria are satisfied by using a Chebyshev minimax technique to approximate the power function. The Chebyshev approximation can be represented as:

$$f(x) \approx \sum_{k=0}^{N-1} c_k T_k(x) - \frac{1}{2} c_o$$

where $T_N(x)$ is a Chebyshev polynomial of the first kind, having N zero crossings in the interval −1 to +1, and $c_j$ is a constant which is defined as:

$$c_j \equiv \frac{2}{N} \sum_{k=1}^{N-1} f(x_k) T_j(x_k)$$

$$= \frac{2}{N} \sum_{k=1}^{N} f\left[\cos\left(\frac{\pi\left(k-\frac{1}{2}\right)}{N}\right)\right] \cos\left(\frac{\pi j\left(k-\frac{1}{2}\right)}{N}\right)$$

In the implementation of the invention, a mathematical program, such as Mathematica, can be used to determine the approximation of a power function over a suitable data interval.

Figure 3:
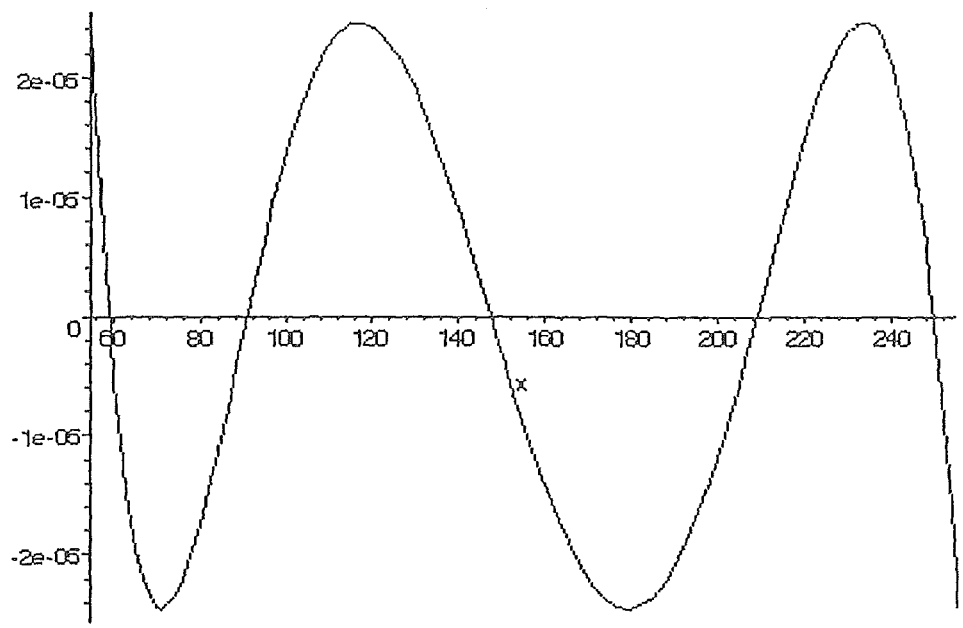
FIG. 3 is a graph of a minimax error curve for an approximation in accordance with the present invention.

The Chebyshev approximation is particularly well suited to the purposes of the present invention, since the error is spread smoothly over the applicable data interval. For instance, FIG. 3 illustrates a typical minimax error curve of such an approximation for an interval of $x^{1/1.8}$, which might be used in video gamma correction. In this particular example, a second-order polynomial was used to approximate the entire interval of interest. One of the advantages associated with a second-order polynomial is that it can be solved directly for the reverse transformation; namely a polynomial containing a square root term. Square roots can be readily calculated in a vector engine, and consequently the efficiency of the process is maintained. Since the reverse calculation is nearly exact, and not another approximation, any error that is added in one direction is essentially subtracted back out when going in the reverse direction. For gamma correction, therefore, the pixels are converted to an almost linear color space using a nearly exact, computationally inexpensive transformation, and then converted back using a nearly exact, computationally inexpensive reverse transformation.

For the forward direction, i.e. $y=x^{5/9}$, the approximating polynomial is:

$$y = c_{00} + (c_{01} + c_{02}x)^2$$

and for the same reverse direction, the approximating polynomial is $$z = c_{10} + \sqrt{(c_{11} + c_{12}y)}$$

where:

$c_{00} = -3.3900\ e-3$ $c_{01} = 5.3500\ e-2$ $c_{02}$=9.5752 e-1
$C_{10}$=−5.5903 e-2
$c_{11}$=3.6909 e-3
$c_{12}$=1.0907 e0

The graph of FIG. 3 represents the error for the forward approximation. As can be seen, the peak error over this interval has a very small magnitude compared to the data values, and ensures the existence of the inverse approximation function that is needed for gamma correction.

Figure 4:
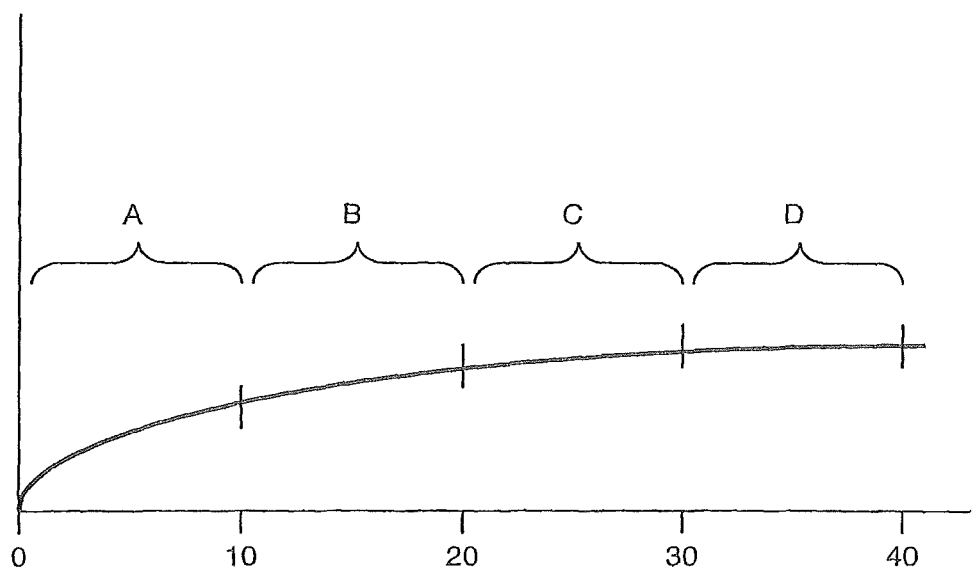
FIG. 4 is a graph illustrating the manner in which the data interval for a function is divided into multiple ranges.

As the range of values to be approximated increases, the error may also grow, to the point where it is no longer sufficient to guarantee the appropriate results. To accommodate such a situation, the desired interval of data values can be divided into multiple ranges, and a respective approximating polynomial can be derived for each range. The entire data interval of interest is therefore approximated in a piecewise manner. FIG. 4 illustrates an example in which the power function has been divided into four ranges, labeled A, B, C and D. For the sake of simplicity, the respective ranges encompass the input values 0-10, 10.1-20, 20.1-30 and 30.1-40. In this example, the input values have a resolution of 0.1. In practice, however, a much finer resolution might be employed. The determination of the number and size of each of the ranges is carried out in an empirical manner. The objective is to match the amount of maximum error in each of the ranges. Some portions of the desired function may be easy to fit with a polynomial. The difficult-to-fit portions may require a number of small ranges to cover them. In practice, the function curve is first fitted with one or more polynomials, and a determination is made to see how close the error is to a desired threshold. The order of the polynomial is then raised, and split over multiple ranges, until the error approaches the desired value for most of the function. The boundaries of the ranges are then adjusted to provide small ranges over the difficult-to-fit part of the curve, and increase the regions that cover the easier-to-fit parts, to provide a contiguous series of ranges that cover the entire data interval of interest.

The process for determining the polynomials may involve a trade-off between the order and number of polynomials on one hand, and the error threshold on the other hand. Higher-order polynomials and higher numbers of regions represent computational costs. Hence, it is desirable to keep these costs as low as possible, while remaining within an acceptable error level across the interval of the function.

Once the approximating polynomials have been determined for each range of values, they are stored in a memory, such as the memory 16, for subsequent computation of the power function. It is only necessary to store the coefficients for the polynomial of each range. Thus, for example, if the polynomial is of order 3, then 4 constants $c_0$-$c_3$ are stored for each range. Subsequently, when a command is received to apply the power function to a given input data value, the following steps are carried out:
 1. Load the input data value;
 2. Determine the range into which the data value falls;
 3. Retrieve the appropriate polynomial coefficients for that range;
 4. Evaluate the polynomial, using the input data value and the retrieved coefficients.

When pursuing the foregoing objectives, it may turn out that polynomials of different orders will be identified for different ones of the respective ranges. As noted previously, lower-ordered polynomials reduce the computational burden. However, in a vector architecture, multiple data points are computed in parallel. As a result, the highest-order polynomial to be employed during the calculations presents the greatest computational expense. For instance, if one data point falls in a region having a fifth-order polynomial and another data point lies in a region having a third-order polynomial, a fifth-order polynomial will effectively be calculated for all of the data points, since it is required for the most difficult case. In essence, the third-order polynomials are promoted to fifth-order polynomials by setting two of their coefficients to a value of zero.

This promotion can be carried out on a cycle-by-cycle basis, so that if the data values in a given array each requires a third-order polynomial, only third-order polynomials will be evaluated for that computation, thereby minimizing the computational expense. However, if at least one of the data values requires a fifth-order polynomial, all of the polynomials used during that computational cycle are promoted to the fifth order.

Alternatively, all of the approximating polynomials can be promoted to the highest order at the time the polynomials are initially chosen and stored for the ranges. In this case, the extra coefficients can be non-zero values to provide a better fit, and thereby reduce error. Before setting all of the polynomials to the highest order, however, it is preferable to correct any imbalance by reducing the range of the highest-order polynomial and increasing the ranges of the lower-order polynomials, to get all of them to the same order, if possible.

The evaluation of the polynomial to approximate the power function is computationally inexpensive, since it only requires multiply and add operations. Consequently the results can be obtained much faster than if the power function itself were computed, or if a table lookup operation were employed. A further advantage of the polynomial approximation resides in the fact that the multiply and add operations can be performed within a vector processor. As a result, multiple values can be computed simultaneously.

Figure 5:
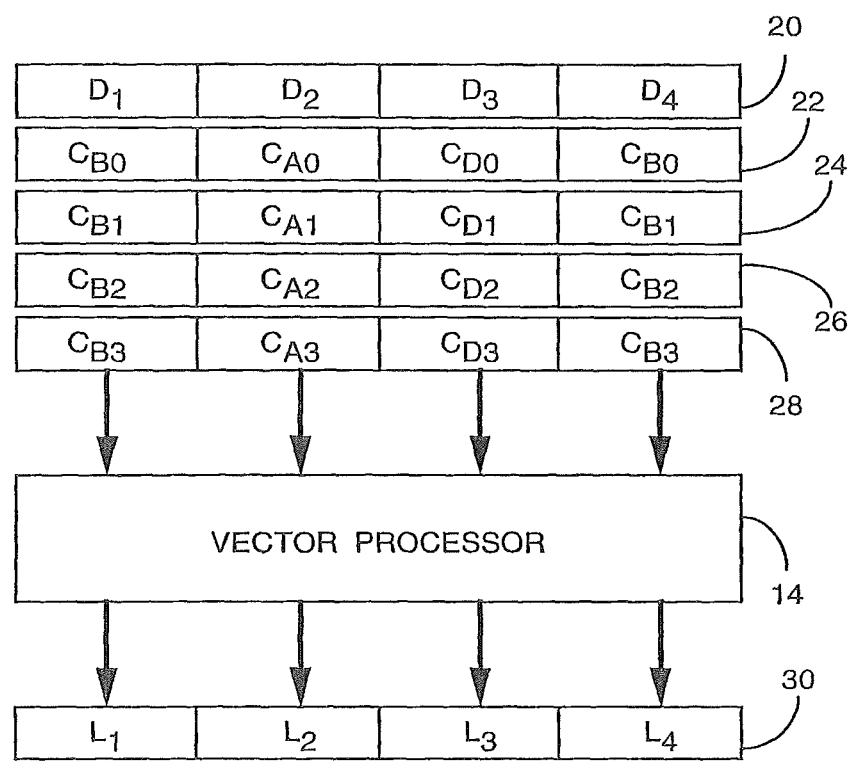
FIG. 5 is a block diagram illustrating the implementation of the present invention in a vector processing environment.

FIG. 5 illustrates the manner in which the computation of the power functions can be implemented in a vector processor. This figure depicts five registers of the vector floating point engine. The first register 20 stores the input data values $D_1$-$D_4$ whose powers are to be computed. The next four registers 22-28 are loaded with the constants for the polynomial to be utilized with the respective data values. In the example of FIG. 5, the first data value $D_1$ falls within the input range B. Therefore, the first position in each of the registers 22-28 is loaded with the constants of the polynomial which approximates the power function over range B, i.e. $c_{B0}$-$c_{B3}$. In a similar manner, the other positions in the registers are loaded with the appropriate values. Thus, in the example, the second data value $D_2$ falls within range A, the third data value $D_3$ falls within range D and the fourth data value $D_4$ falls again within range B. Accordingly, the respective positions within the registers 22-28 are loaded with the constants that define the polynomials for these respective ranges.

Once the registers have been loaded with the appropriate information, the stored values are all processed simultaneously within the vector processing engine 14. The result is four output values $L_1$-$L_4$, which are stored in another register 30.

From the foregoing, therefore, it can be seen that the present invention provides a mechanism to approximate power functions that does not rely on large lookup tables. Since it only requires the storage of a few constants for each range of the data interval, it presents a very small memory footprint, and avoids unnecessary cache flushing.

The use of the Chebyshev minimax polynomial provides precise control over the maximum error in the polynomial approximation, thereby providing improved signal quality. As a result, it is possible to achieve a level of error that is sufficiently small such that the resulting output values do not deviate from the exact result by more than an acceptable level of tolerance.

Furthermore, the approximation can be entirely implemented within a vector processing unit, and thereby avoids the delays that occur with techniques that require branching to a scalar processing unit.

The invention has been described in the context of its application to power functions. However, it will be appreciated by those skilled in the field that the invention is not limited to this particular application. Rather, it will find utility in any situation in which it is desirable to compute a complex function in a fast and accurate manner. Accordingly, the references to a power function should be viewed as exemplary, rather than limiting.

The presently disclosed embodiments are, therefore, considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A method for processing an image for display in a computer system, comprising:
   receiving an input display value for a pixel of the image in a first color space;
   generating, in a processing unit of the computer system, a corrected display value in a second color space by evaluating a second-order polynomial that approximates a power function corresponding to the gamma of a display device, in accordance with the input display value;
   processing, in the processing unit of the computer system, the corrected display value in the second color space to produce a processed display value for the pixel; and
   converting, in the processing unit of the computer system, the processed display value to the first color space by evaluating a function that is an approximation of the inverse of the power function in accordance with the processed display value, wherein the second-order polynomial is selected among a plurality of second-order polynomials that piecewise approximate the power function over a plurality of intervals, and wherein the polynomials and the intervals are determined such that a maximum error between the approximation and the power function is approximately equal for each of the intervals.

2. The method of claim 1, wherein the processing comprises combining the corrected display value with another display value in the second color space to generate a blended display value for the pixel.

3. The method of claim 1, wherein the generating of the corrected display value comprises utilizing a Chebyshev minimax approximation technique in approximating the power function.

4. A non-transitory computer-readable storage medium having a computer program recorded thereon that causes a computer to transform an image by performing operations comprising:
   receiving an input display value for a pixel of the image in a first color space;
   generating a corrected display value in a second color space by evaluating a second-order polynomial that approximates a power function corresponding to the gamma of a display device, in accordance with the input display value;
   processing the corrected display value in the second color space to produce a processed display value for the pixel;
   converting the processed display value to the first color space by evaluating a function that is an approximation of the inverse of the power function in accordance with the processed display value, wherein the second-order polynomial is selected among a plurality of second-order polynomials that piecewise approximate the power function over a plurality of intervals, and wherein the polynomials and the intervals are determined such that a maximum error between the approximation and the power function is approximately equal for each of the intervals; and
   outputting the converted display value on the display device.

5. The non-transitory computer-readable storage medium of claim 4, wherein the computer program causes the computer to combine the corrected display value with another display value in the second color space to generate a blended display value for the pixel.

6. The non-transitory computer-readable storage medium of claim 4, wherein the generating of the corrected display value comprises utilizing a Chebyshev minimax approximation technique in approximating the power function.

7. A system comprising:
   a display device; and
   a processor configured to:
      receive an input display value for a pixel of an image in a first color space; generating a corrected display value in a second color space by evaluating a second-order polynomial that approximates a power function corresponding to the gamma of the display device, in accordance with the input display value;
      process the corrected display value in the second color space to produce a processed display value for the pixel;
      convert the processed display value to the first color space by evaluating a function that is an approximation of the inverse of the power function in accordance with the processed display value, wherein the second-order polynomial is selected among a plurality of second-order polynomials that piecewise approximate the power function over a plurality of intervals, and wherein the polynomials and the intervals are determined such that a maximum error between the approximation and the power function is approximately equal for each of the intervals; and
      output the converted display value on the display device.

8. The system of claim 7, wherein the corrected display value is combined with another display value in the second color space to generate a blended display value for the pixel.

9. The system of claim 7, wherein the generating of the corrected display value comprises utilizing a Chebyshev minimax approximation technique in approximating the power function.

10. The system of claim 7, wherein the generating of the corrected display value comprises utilizing a Chebyshev minimax approximation technique in approximating the power function.

* * * * *